Aug. 2, 1955
H. F. HEISLER
2,714,503
CARBURETOR JET
Filed Jan. 14, 1953
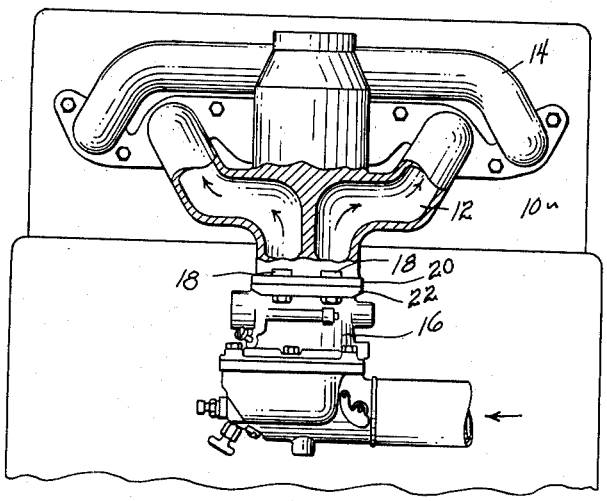
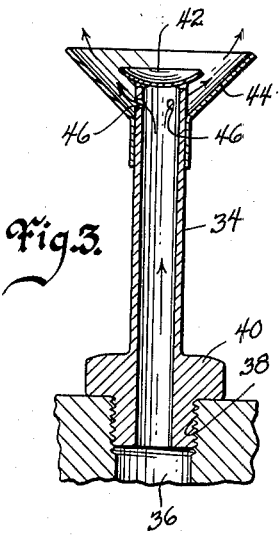
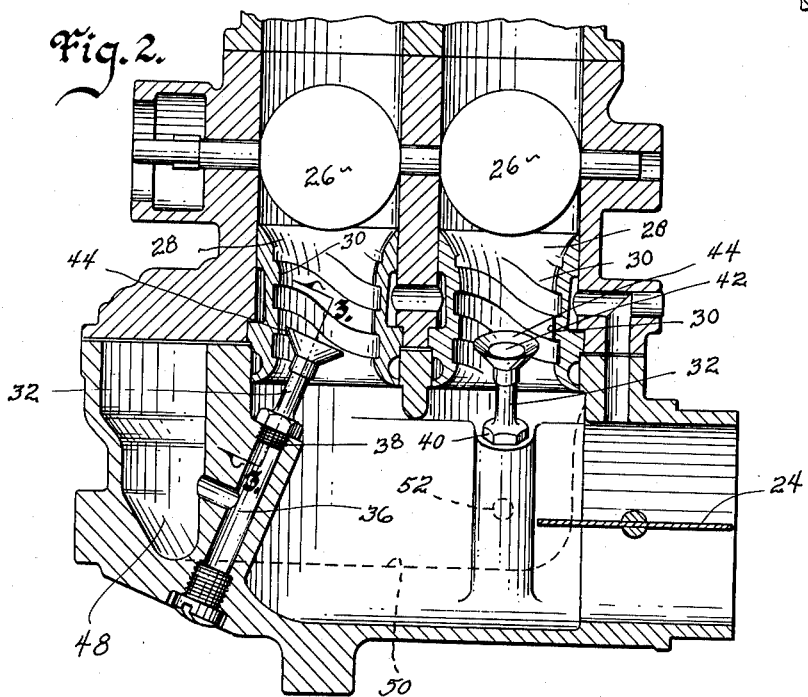
Witness
Edward P. Seeley
Inventor
Harry F. Heisler
by Talbert Dick & Adler
Attorneys United States Patent Office 2,714,503
Patented Aug. 2, 1955

2,714,503

CARBURETOR JET

Harry F. Heisler, Hudson, Iowa

Application January 14, 1953, Serial No. 331,284

2 Claims. (Cl. 261—78)

My invention relates to the introduction of mixed fuel and air into an internal combustion engine. Specifically, I have invented a carburetor that employs novel venturi tubes and jet nozzles, whereby more efficient use is made of the fuel and air consumed by the engine.

In float type carburetors before now, the jets have consisted of a mere orifice that limits the amount of liquid gasoline that can be drawn into the carburetor throat by a given differential air pressure. Furthermore, the walls of the venturi tube in the usual carburetor are smooth. As a result of these two structures being used together, relatively poor mixing of the gasoline and air takes place, with the result that unequal distribution of fuel and air to the cylinders occurs. Because the jets are mere orifices, raw gasoline in liquid form often runs down the side walls of the carburetor and manifold. As the air flowing through the smooth venturi is afforded a straight passage therethrough, this raw gasoline is not evenly distributed through the air. Poor mixing obviously must result and consequently some cylinders receive a rich mixture carrying a heavy preponderance of gasoline, while others are starved with mixtures too thin for the operation required.

Many attempts have been made to improve upon these difficulties of venturi type carburetion. Some of these attempts have been reasonably successful, but only at the expense of additional equipment and bulk to the usual carburetor. In some cases, a veritable labyrinth of air fuel mixing passageways is inserted between the carburetor and the manifold. It is my opinion that these so-called mixers tend to reduce the efficiency of flow through the carburetion system. It appears to me, therefore, that whatever advantages in economy are produced by these devices is accomplished at the expense of maximum speed and power.

In view of the foregoing, therefore, it is the principal object of my invention to provide a carburetor that increases the efficiency of the distribution of fuel and air to an engine.

It is a further object of my invention to provide a carburetor that provides an improved mixing of fuel and air in and immediately after the carburetor itself.

It is a further object of my invention to provide a carburetor that improves the economy of operation of an engine without reducing its power or speed limits.

It is a further object of my invention to provide a carburetor that provides for better dispersal of gasoline or other fuel in the air being inducted into the engine, without reducing the flow of air into the engine.

It is a further object of my invention to provide a carburetor that is economical to manufacture, durable in use, and refined in appearance.

These and other objects will be apparent to those skilled in the art.

My invention consists in the construction, arrangement, and combination of the various parts of the device, whereby the objects contemplated are attained as hereinafter more fully set forth, pointed out in my claims, and illustrated in the accompanying drawings, in which:

Fig. 1 is a side elevation view of my carburetor, together with an appropriate manifold and shown mounted on an outlined representation of an internal combustion engine. Portions of the intake manifold are broken away to illustrate the flow of air and fuel mixture to the engine.

Fig. 2 is an enlarged vertical sectional view of my carburetor in which broken lines represent hidden portions, and Fig. 3 is a greatly enlarged vertical sectional view of one of my gasoline discharge nozzles, taken on line 3—3 of Fig. 2.

Referring to the drawings, I have used the numeral 10 to designate the cylinder block of an internal combustion engine on which is mounted a dual intake manifold 12 and an appropriate exhaust manifold 14, which are constructed as a unified casting. My carburetor is shown in Fig. 1 and is generally designated by the numeral 16. It is secured to the manifold in a conventional manner as with the nuts and bolts 18 extending through the flanges 20 and 22 on the manifold and carburetor respectively.

Turning now to the vertical sectional view shown in Fig. 2, the carburetor is equipped with the customary choke valve designated 24 and throttle valves 26, which are mounted in the throat of the carburetor in the usual fashion. My novel venturi tubes are identical and designated by the numeral 28. Their novelty lies in having a plurality of spiral ridges formed thereon which ridges are designated by the numeral 30. These ribs or baffles 30 are set at a steep angle so that no one rib quite completes a single turn about the venturi. The purpose of these baffles is to impart a whirling or rotary motion to the air, at least near the edges of the venturi tubes. At the same time, it is obvious that there is little or no obstruction of air flow through the tube center. Into the throats of the venturi tubes in the usual manner, are projected the discharge nozzles 32. These discharge nozzles are best understood by an examination of Fig. 3 which is greatly enlarged and shows in cross-section the exact structure. The tube 34 is provided with any suitable means for mounting it in a fuel supply line such as the drilled passage 36 and I have shown such a means as the threads 38. In order to provide for the ready insertion and removal of the nozzle, the portion of the tube just above the threads is formed into a nut designated 40. The outer end of the discharge tube is sealed by means of a concavo-convex plate designated 42. It is secured to the tube with the convex side facing the tube. Secured to the tube near the plate is a funnel-like structure designated 44, while between these two elements are drilled the metering orifices designated 46. The gas supply drilled passageway 36 is connected to the carburetor bowl source 48 which is connected in the usual manner by means of a suitable line to a source of fuel. A float and check valve system maintains the gasoline level in the bowl in the usual manner and this structure being well known is not shown.

The dotted line indicated at 50 shows the continuation of the carburetor bowl 48 around the side of the carburetor. The dotted circle designated 52 indicates a drilled passageway connecting the second nozzle to the carburetor bowl.

The advantages that flow from my carburetor structure are the product of the interaction of the movement of the air in the venturis which is caused by the spiral ribs or baffles and the spraying of the gasoline from the nozzles. Also the funnel elements 44 tend to deflect air passing through the venturis toward the outside of the throats and into the spiral baffles. The funnels, therefore, not only aid in spraying gasoline, but also aid the spiral baffles in imparting a circular motion to the air passing through the venturi. Since the nozzles throw the gasoline out into the air in the form of a fine spray and because the air flowing through the venturi is given a circular motion by the spiral baffles, a thorough mixing of the gasoline and air occurs. I have also discovered that ribs about one-quarter of an inch wide and spaced about one-quarter of an inch from each other, are very satisfactory. A satisfactory thickness for these ribs has been determined to be one-tenth of an inch.

While I have shown my structure in the form of a twin throated carburetor, it is my belief that the mixing effect produced by the spiral ribs and spray nozzles will greatly increase the efficiency of a single throat carburetor system also. The more thorough mixing of the gasoline and air even in a single throat carburetor which provides the cylinders with a mixture that is consistent as to percentage of gasoline aids in controlling engine temperature. As the richness of the gasoline mixture has a direct bearing on the temperature created in the cylinder, my new carburetor also aids in maintaining engine temperatures. The more consistently efficient engine temperatures that are achieved by my new carburetor are another factor in increasing the actual power out-put of the engine.

Some changes may be made in the construction and arrangement of my carburetor without departing from the real spirit and purpose of my invention, and it is my intention to cover by my claims, any modified forms of structure or use of mechanical equivalents which may be reasonably included within their scope.

I claim:

1. A carburetor dispersal jet comprising, a tube, a concavo-convex plate having a diameter greater than that of the diameter of said tube secured to and closing one end of said tube with the convex side facing said tube end, a funnel shaped element having a diameter greater than that of the diameter of said plate secured to said tube near said concavo-convex plate; said tube having metering orifices formed therein between said concavo-convex plate and said funnel shaped element and discharging laterally directly toward the inside of said funnel shaped element, and means formed at the other end of said tube for securing it to a carburetor jet supply passageway.

2. In a carburetor dispersal jet, comprising, a tube, a plate element having a diameter greater than that of the diameter of said tube, secured to and closing one end of said tube and having its side facing said tube convex, a funnel shaped element secured to said tube and in spaced relationship to and below said plate element; said tube having orifices formed therein between said plate element and said funnel shaped element discharging laterally toward said funnel shaped element; said tube designed to have its end opposite from the end to which said plate element is secured to a carburetor jet supply passageway.

References Cited in the file of this patent

UNITED STATES PATENTS

| | | |
|---|---|---|
| 737,463 | Pearson | Aug. 25, 1903 |
| 848,170 | Hedstrom | Mar. 26, 1907 |
| 1,207,681 | Broderick | Dec. 5, 1916 |
| 1,381,253 | Thomasson | June 14, 1921 |
| 1,457,408 | Sunderman | June 5, 1923 |
| 1,802,766 | Kerr | Apr. 28, 1931 |
| 2,120,620 | Mowery | June 14, 1938 |
| 2,456,626 | Dahnke | Dec. 21, 1948 |
| 2,533,969 | Socall | Dec. 12, 1950 |

FOREIGN PATENTS

| | | |
|---|---|---|
| 770,696 | France | July 2, 1935 |